(12) United States Patent
Wang

(10) Patent No.: US 9,012,109 B2
(45) Date of Patent: Apr. 21, 2015

(54) PRE-TREATMENT METHOD FOR MEMBRANE ELECTRODE ASSEMBLY

(75) Inventor: Zhilei Wang, Penfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1914 days.

(21) Appl. No.: 10/921,241

(22) Filed: Aug. 18, 2004

(65) Prior Publication Data

US 2006/0040155 A1   Feb. 23, 2006

(51) Int. Cl.
*H01M 8/00*   (2006.01)
*H01M 8/10*   (2006.01)

(52) U.S. Cl.
CPC .......... *H01M 8/1004* (2013.01); *H01M 8/1023* (2013.01); *H01M 8/1039* (2013.01); *Y02E 60/521* (2013.01)

(58) Field of Classification Search
None
See application file for complete search history.

(56) References Cited

U.S. PATENT DOCUMENTS

| | | | |
|---|---|---|---|
| 6,372,379 B1 * | 4/2002 | Samii et al. ................... | 429/145 |
| 2001/0028967 A1 * | 10/2001 | Roberts et al. .................. | 429/13 |
| 2003/0013774 A1 * | 1/2003 | Mukoyama et al. ............ | 521/27 |
| 2003/0064277 A1 * | 4/2003 | Sugiura et al. .................. | 429/38 |
| 2003/0113604 A1 * | 6/2003 | Bahar et al. ...................... | 429/30 |
| 2005/0281981 A1 * | 12/2005 | Puffer et al. .................. | 428/137 |

OTHER PUBLICATIONS

Sun et al., "Acid-Organic base swollen polymer membranes," Electrochimica Acta 46 (2001) 1703-1708.*
Gielniak et al., "Power Management Strategy Based on Game Theory for Fuel Cell Hybrid Electric Vehicles," IEEE, 2004, p. 4422-4426.*
Webster's Third New International Dictionary; Copyright 1993 by Merriam-Webster Inc., Springfield, Massachusetts; pp. 595 and 1107.

* cited by examiner

*Primary Examiner* — Barbara Gilliam
*Assistant Examiner* — Steven Scully
(74) *Attorney, Agent, or Firm* — BrooksGroup

(57) ABSTRACT

A method for pre-treating a membrane electrode assembly (MEA) for a fuel cell is disclosed. According to the method of the invention, the MEA is subjected to multiple wet/dry cycles prior to assembly of the MEA into the fuel cell stack. The pre-treatment wet/dry cycles of the present invention eliminate or reduce the irreversible dimensional changes which occur in the polymer electrolyte membrane in the MEA throughout the wet/dry cycles of fuel cell operation. This reduces stress applied to the MEA throughout wet/dry cycles which occur during operation of the fuel cell. Consequently, the formation and propagation of pinholes in the membrane is reduced, increasing the lifetime of the MEA.

28 Claims, 2 Drawing Sheets

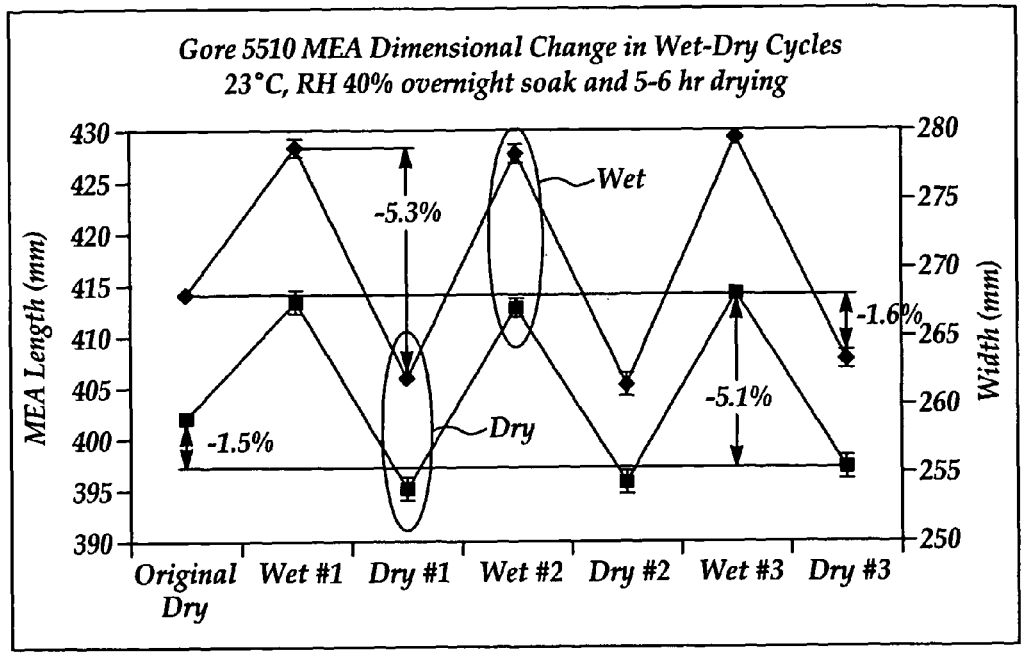
*Figure 1*
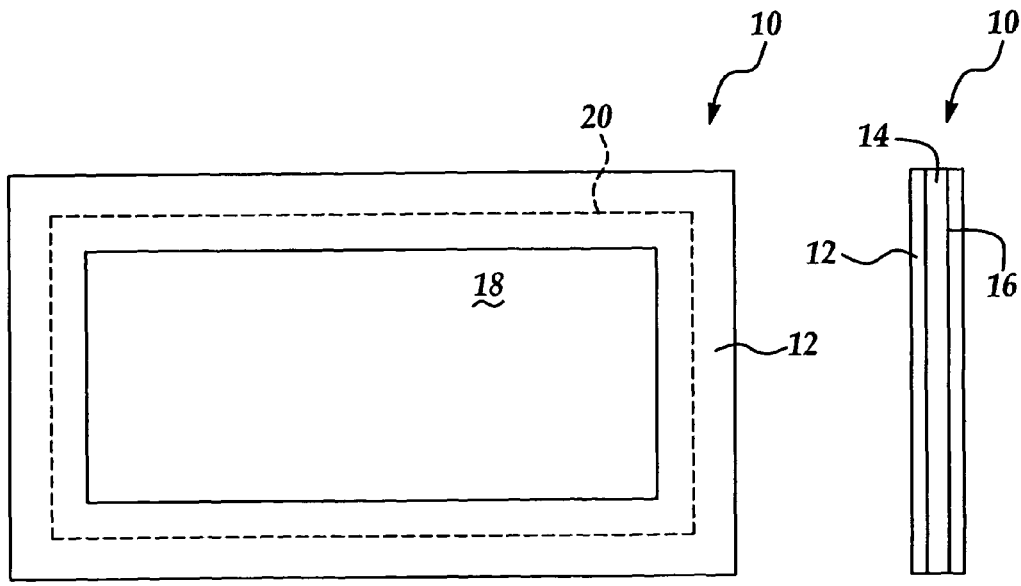
*Figure 2*     *Figure 2A*

PRE-TREATMENT METHOD FOR MEMBRANE ELECTRODE ASSEMBLY

FIELD OF THE INVENTION

The present invention relates to fuel cell electric vehicles which utilize a membrane electrode assembly (MEA) to generate electricity for power. More particularly, the present invention relates to a method for pre-treatment of a membrane electrode assembly to reduce stresses applied to the assembly throughout wet/dry cycles.

BACKGROUND OF THE INVENTION

Fuel cell technology is a relatively recent development in the automotive industry. It has been found that fuel cell power plants are capable of achieving efficiencies as high as 55%. Furthermore, fuel cell power plants emit no harmful by-products which would otherwise contribute to atmospheric pollution.

In order to prevent leakage of the hydrogen fuel gas and oxygen gas supplied to electrodes and prevent mixing of the gases in a fuel cell, a gas-sealing material and gaskets are arranged on the periphery of the electrodes, with the polymer electrolyte membrane sandwiched there between. The sealing material and gaskets are assembled into a single part together with the electrodes and polymer electrolyte membrane to form a membrane and electrode assembly (MEA). Disposed outside of the MEA are conductive separator plates for mechanically securing the MEA and electrically connecting adjacent MEAs in series. A portion of the separator plate, which is disposed in contact with the MEA, is provided with a gas passage for supplying hydrogen fuel gas to the electrode surface and removing generated water.

During fabrication of a fuel cell, the polymer electrolyte membrane of each MEA is produced in roll form under tension. The polymer electrolyte membrane has a high water uptake capability. Therefore, when wet, the membrane will expand in all three directions, although not proportionally. The membrane will shrink in all three dimensions upon subsequent drying.

As shown in FIG. 1 for example, the dimensional change of the membrane is irreversible after the first wet/dry cycle, since after drying, the membrane shrinks to a size which is smaller than the size of the membrane before the membrane was wetted for the first time. After two wet/dry cycles, however, the dimensional changes in the subsequent cycles are shown to be reversible since the membrane shrinks to the same size after completion of each wet/dry cycle. The irreversible component of the dimensional change is caused by the residue stress. The shrink rate in the X-Y dimensions is about 1-15%, as shown in FIG. 1 for example.

In a conventional MEA, the polymer electrolyte membrane is assembled into the MEA. In a fuel cell, multiple MEAs are assembled in fuel cell stacks, with one MEA per cell. One of the major failure modes for most fuel cell stacks are due to H2 crossover to the cathode side across the polymer electrolyte membrane, due to the presence of pinholes in the membrane. SEM analysis on the crossover locations has revealed that the membrane pinholes are caused by mechanical stresses such as tensile stress applied to the membrane. These stresses are related to the fuel cell operating conditions, especially to the relative humidity (RH) swing and cycling rates. Each MEA, having never been subjected to a wet/dry cycle, is assembled into a fuel cell under a relative humidity (RH) of typically about 20-60%. During fuel cell operation, each MEA will undergo wet and dry cycles in which the RH can be as high as 150%.

After the first wet/dry cycle of fuel cell operation, the MEA shrinks in size. However, the shrinking movement of the membrane is resisted by stack seals which clamp the MEA edges to a fixed dimension. This exerts stress on the polymer electrolyte membrane, causing the formation and propagation of pinholes in the membrane. Therefore, a method is needed to pre-treat an MEA prior to assembly of the MEA into a fuel cell stack in order to eliminate or reduce the irreversible dimensional changes of a polymer electrolyte membrane throughout wet/dry cycles during operation of the fuel cell. By eliminating or reducing the irreversibility of the dimensional changes of the polymer electrolyte membrane minimizes tensile stress and reduces the formation and propagation of pinholes in the membrane, leading to increased MEA lifetime.

SUMMARY OF THE INVENTION

The present invention is generally directed to a method for pre-treating a membrane electrode assembly (MEA) for a fuel cell. The MEA includes a polymer electrolyte membrane that is sandwiched between a cathode layer and an anode layer. Prior to assembly of the MEA into a fuel cell stack, the MEA is pre-treated in order to eliminate or reduce irreversible dimensional changes that take place in the membrane throughout wet/dry cycles of fuel cell operation. According to the method of the invention, the MEA is subjected to multiple wet/dry cycles, each of which typically includes ways of hydrating the MEA and dehydrating the MEA, respectively, prior to assembly of the MEA into the fuel cell stack. The wet/dry cycles of the present invention eliminate or reduce the irreversible dimensional changes which occur in the polymer electrolyte membrane in the MEA throughout the wet/dry cycles in fuel cell operation. This reduces stress applied to the MEA throughout wet/dry cycles which occur during operation of the fuel cell. Consequently, the formation and propagation of pinholes in the membrane is reduced, increasing the lifetime of the MEA.

BRIEF DESCRIPTION OF THE DRAWINGS

The invention will now be described, by way of example, with reference to the accompanying drawings, in which:

FIG. 1 is an example a graph in which dimensional changes in a MEA are plotted as a function of successive wet/dry cycles;

FIG. 2 is a top view of an illustrative embodiment of a pre-treated membrane electrode assembly of the present invention;

FIG. 2A is a transverse cross-sectional view of the membrane electrode assembly of FIG. 2.

DETAILED DESCRIPTION OF THE INVENTION

Figure 3:
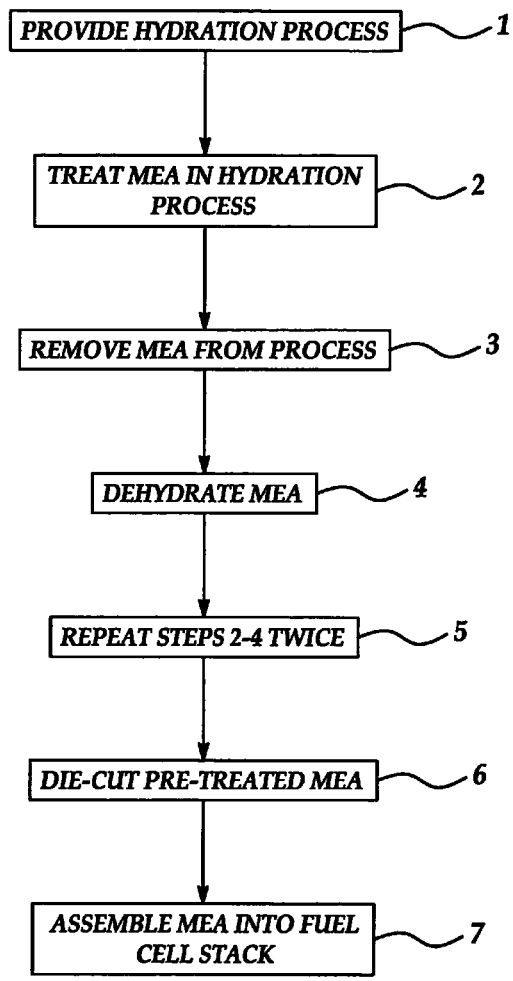
FIG. 3 is a flow diagram which illustrates sequential process steps carried out according to the present invention.

The present invention is generally directed to a method for pre-treating a membrane electrode assembly (MEA) for a fuel cell. The MEA typically includes a polymer electrolyte membrane that is sandwiched between a cathode layer and an anode layer. According to the method of the invention, prior to assembly with other MEAs into a fuel cell stack, each MEA is pre-treated in order to eliminate or reduce the irreversible dimensional changes that represent residual stress in the MEA. Pre-treatment of the MEA includes subjecting the MEA to at least three hydration/dehydration cycles prior to assembly of the fuel cell stack. Consequently, the polymer electrolyte membrane in the MEA undergoes reversible, rather than irreversible, dimensional changes when confined by the gaskets or seals that seal the membrane between the cathode layer and anode layer. This reduces stress applied to the MEA throughout wet/dry cycles which occur during operation of the fuel cell, reducing the formation and propagation of pinholes in the MEA and prolonging the lifetime of the MEA.

Referring to FIGS. 2 and 2A, an illustrative embodiment of a membrane electrode assembly (MEA) according to the present invention is generally indicated by reference numeral 10. The MEA 10 includes a cathode layer 12 and an anode layer 16, between which is sandwiched a polymer electrolyte membrane 14 that selectively transports hydrogen ions. An example of such polymer electrolyte membrane used in PEM fuel cells is a perfluorosulfonic acid based membrane of 0.5-7 mil thick. A seal 20, such as a gasket, is provided between the cathode layer 12 and the anode layer 16 to seal the polymer electrode membrane 14 in the MEA 10. The cathode layer 12 includes a catalyst area 18 which is typically a carbon powder that includes a platinum group metal catalyst which catalyzes the formation of water from oxygen, electrons and hydrogen ions. The MEA 10 can be assembled using conventional techniques and materials known by those skilled in the art.

Referring next to the flow diagram of FIG. 3, according to the method of the present invention, hydration process is initially provided, as indicated in step 1. Preferably, the temperature in this process is maintained at typically about 20–90 degrees C. As indicated in step 2, the MEA 10 is next treated in the hydration process for a period of typically about 5 seconds to 60 minutes. The MEA 10 is then removed from the hydration process, as indicated in step 3, and excess moisture is allowed to be removed from the MEA 10. Next, the MEA 10 is dehydrated, as indicated in step 4. Preferably, dehydration of the MEA 10 is carried out at a temperature of from typically about room temperature to typically about 80 degrees C. Therefore, implementation of steps 2-4 encompasses one complete wet/dry cycle of the MEA 10.

After completion of the wet/dry cycle of steps 2-4, the MEA 10 is typically subjected to two additional wet/dry cycles (step 5), each of which includes hydrating the MEA (step 2); allowing excess moisture to be removed from the MEA 10 (step 3); and dehydrating the MEA 10 (step 4). This facilitates the elimination or reduction of the irreversible dimensional changes in the MEA 10 throughout all subsequent wet/dry cycles. According to the knowledge of those skilled in the art, the pre-treated MEA 10 is then die-cut into the desired size and shape for assembly into the fuel cell stack, as indicated in step 6 of FIG. 3. Finally, as indicated in step 7, the MEA 10 is assembled with other components into a fuel cell stack (not shown) during fabrication of the fuel cell, according to the knowledge of those skilled in the art. Assembly of the MEA 10 into a fuel cell stack typically involves using conductive separator plates (not shown) to mechanically secure the MEA 10 in the fuel cell stack and electrically connect adjacent MEAs 10 to each other in series. A portion of the separator plate is typically provided in contact with the MEA 10 and is provided with a gas passage which supplies hydrogen gas to the anode layer 16 and distributes product gas water vapor away from the cathode layer 12.

In operation of the fuel cell of which the MEA 10 is a part, hydrogen gas is supplied to the anode layer 16. The catalyst on the anode layer 16 splits the hydrogen gas into electrons and protons. The electrons are distributed as electric current from the anode layer 16, through a drive motor (not shown) and then to the cathode layer 12. The protons migrate from the anode layer 16, through the polymer electrolyte membrane 14 to the cathode layer 12. The catalyst on the cathode layer 12 combines the protons with electrons returning from the drive motor and oxygen from the air to form water.

Throughout operation of the fuel cell, the MEA 10 undergoes repetitive wet/dry cycles in which the relative humidity (RH) of the MEA 10 can reach levels as high as 150%. Accordingly, the MEA 10 expands during the wet part of the cycle and contracts during the dry part of the cycle. However, because it was pre-treated according to the method of FIG. 3, the irreversible dimensional changes which occur in the MEA 10 throughout the wet/dry cycle are eliminated or reduced. Therefore, the MEA 10 can almost returns to the same dimensions after the wet and dry portions of each wet/dry cycle. This substantially reduces the magnitude of stress applied by the seal 20 to the membrane 14, thereby preventing or reducing the formation and propagation of pinholes in the membrane 14 and prolonging the lifetime of the MEA 10.

It will be appreciated by those skilled in the art that the MEA of the present invention has extended a stack life typically about 1-2 times, as compared to a stack life of a typical conventional MEA. It has been found that the formation of pinholes in the membrane electrode assembly of the present invention occurs has been delayed 1-2 times as in the MEA of the conventional MEA, although the rate of propagation of the pinhole in the MEA of the present invention occurs only a little slower.

While the preferred embodiments of the invention have been described above, it will be recognized and understood that various modifications can be made in the invention and the appended claims are intended to cover all such modifications which may fall within the spirit and scope of the invention.

What is claimed is:

1. A method of pre-treating a membrane electrode assembly to shrink the membrane electrode assembly prior to assembly of the membrane electrode assembly into a fuel cell stack to reduce irreversible planar dimensional changes of the membrane electrode assembly in the fuel cell stack, comprising:

a) providing a hydration process, and a membrane electrode assembly comprising a polymer electrolyte membrane constructed and arranged to selectively transport hydrogen ions and prevent $H_2$ crossover from a cathode side of the polymer electrolyte membrane during use in a fuel cell;

b) subjecting the membrane electrode assembly, wherein the membrane of the assembly is susceptible to irreversible planar dimensional changes upon a hydration/dehydration cycle, to the hydration process in order to provide moisture thereto and in order to expand the membrane electrode assembly;

c) dehydrating the membrane electrode assembly to remove moisture therefrom and to contract the membrane electrode assembly in at least the length and width directions; and d) repeating b and c over at least one additional hydration/dehydration cycle so that the length and width to which the membrane contracts during subsequent hydration/dehydration cycles is such that that pinhole formation in the membrane is reduced when the pre-treated membrane electrode assembly is used in a fuel cell stack and so that the pre-treated membrane undergoes reversible dimensional changes upon subsequent hydration/dehydration cycles.

2. The method of claim 1 wherein the hydration process is maintained at a temperature range of from about 20 degrees C. to about 90 degrees C.

3. The method of claim 1 wherein the membrane electrode assembly is subjected to the hydration process from about 5 seconds to about 60 minutes.

4. The method of claim 1 wherein the temperature in the hydration process is maintained at a temperature range of from about 20 degrees C. to about 90 degrees C. and the membrane electrode assembly is subjected to the hydration process from about 5 seconds to about 60 minutes.

5. The method of claim 1 wherein dehydrating the membrane electrode assembly comprises subjecting the membrane electrode assembly to a temperature of from about room temperature to about 80 degrees C.

6. The method of claim 1 wherein subjecting the membrane electrode assembly to the hydration process and dehydrating the membrane electrode assembly comprises subjecting the membrane electrode assembly to a first wet/dry cycle and further comprising subjecting the membrane electrode assembly to second and third wet/dry cycles, respectively.

7. The method of claim 6 wherein the hydration process is maintained at a temperature range of from about 20 degrees C. to about 90 degrees C.

8. The method of claim 7 wherein the membrane electrode assembly is subjected to the hydration process from about 5 seconds to about 60 minutes.

9. A method as set forth in claim 1 further comprising, after step d, assembling the pre-treated and membrane electrode assembly in a fuel cell stack and operating the fuel cell stack through multiple hydration/dehydration cycles.

10. A method as set forth in claim 1 wherein the length and width to which the membrane contracts during subsequent hydration/dehydration cycles ranges from 0-1.6 percent.

11. A method as set forth in claim 1 further comprising repeat in b and c at least once more.

12. A method of extending a lifetime of a membrane electrode assembly in a fuel cell stack by reducing irreversible planar dimensional changes of the membrane electrode assembly in the fuel cell stack, comprising:
providing a membrane electrode assembly comprising, and a membrane electrode assembly comprising a polymer electrolyte membrane constructed and arranged to selectively transport hydrogen ions and prevent H$_2$ crossover from a cathode side of the polymer electrolyte membrane during use in a fuel cell;
subjecting the membrane electrode assembly, wherein the membrane of the assembly is susceptible to irreversible planar dimensional changes upon a hydration/dehydration cycle, to a plurality of hydration/dehydration cycles to provide moisture to and remove moisture from the membrane electrode assembly so that repeatedly expanding and contracting the membrane electrode assembly before assembling in at least the width and length direction the membrane electrode assembly into the fuel cell stack so that the length and width to which the membrane contracts during subsequent hydration/dehydration cycles is such that pinhole formation in the membrane is reduced when the pre-treated membrane electrode assembly is used in a fuel cell stack.

13. The method of claim 12 wherein a hydration component of each hydration/dehydration cycle is maintained at a temperature range of from about 20 degrees C. to about 90 degrees C.

14. The method of claim 12 wherein a hydration component of each hydration/dehydration cycle is carried out for 5 seconds to 60 minutes.

15. The method of claim 12 wherein a hydration component of each hydration/dehydration cycle is maintained at a temperature range of from about 20 degrees C. to about 90 degrees C. and the hydration component of each hydration/dehydration cycle is carried out for 5 seconds to 60 minutes.

16. The method of claim 12 wherein subjecting the membrane electrode assembly to a plurality of hydration/dehydration cycles comprises subjecting the membrane electrode assembly to at least three hydration/dehydration cycles.

17. A method as set forth in claim 12 wherein the length and width to which the membrane contracts during subsequent hydration/dehydration cycles ranges from 0-1.6 percent.

18. A method comprising:
providing a membrane electrode assembly comprising a polymer electrolyte membrane constructed and arranged to selectively transport hydrogen ions and prevent H$_2$ crossover from a cathode side of the polymer electrolyte membrane during use in a fuel cell,
shrinking a membrane electrode assembly before assembling the membrane electrode assembly into a fuel cell stack, by expanding and contracting the membrane electrode assembly with a plurality of hydration and dehydration cycles, which include:
hydrating the membrane electrode assembly, wherein the membrane of the assembly is susceptible to irreversible planar dimensional changes upon a hydration/dehydration cycle, to provide moisture to the membrane electrode assembly to expand the membrane electrode assembly; and
dehydrating the membrane electrode assembly to remove the moisture from the membrane electrode assembly to planar contract the membrane electrode assembly so that the length and width to which the membrane contracts during subsequent hydration/dehydration cycles is such that pinhole formation in the membrane is reduced when the pre-treated membrane electrode assembly is used in a fuel cell stack.

19. A method as set forth in claim 18, further comprising:
assembling the shrunk membrane electrode assembly into the fuel cell stack.

20. A method as set forth in claim 18, wherein the membrane electrode assembly is hydrated at a temperature of from about 20 degrees C. to about 90 degrees C.

21. A method as set forth in claim 18, wherein the membrane electrode assembly is dehydrated at a temperature of from about room temperature to about 80 degrees C.

22. A method as set forth in claim 18, wherein the membrane electrode assembly is hydrated for about 5 seconds to about 60 minutes.

23. A method as set forth in claim 18, wherein the plurality of hydration and dehydration cycles includes at least three hydration and dehydration cycles.

24. A method as set forth in claim 18, wherein the plurality of hydration and dehydration cycles includes no more than three hydration and dehydration cycles.

25. A method as set forth in claim 18, wherein the membrane electrode assembly is die-cut before being assembled in the fuel cell stack.

26. A method as set forth in claim 18 wherein the length and width to which the membrane contracts during subsequent hydration/dehydration cycles ranges from 0-1.6 percent.

27. A method comprising:
(a) providing a membrane electrode assembly comprising a polymer electrolyte membrane constructed and arranged to selectively transport hydrogen ions and prevent H$_2$ crossover from a cathode side of the polymer electrolyte membrane during use in a fuel cell, the membrane of the assembly being susceptible to irreversible planar dimensional changes upon a cycle of increasing water content and decreasing water content in the membrane electrode assembly, wherein the membrane electrode assembly expands and contracts;

(b) increasing the water content of the membrane electrode assembly so that the membrane electrode assembly expands;

(c) thereafter decreasing the water content of the membrane electrode assembly so that the membrane electrode assembly contracts in at least the length and width directions; and (d) repeating (b) and (c) for at least one additional cycle;

(e) thereafter assembling the membrane electrode assembly in a fuel cell stack.

28. A method comprising:

providing a membrane electrode assembly comprising a polymer electrolyte membrane constructed and arranged to selectively transport hydrogen ions and to prevent $H_2$ crossover from a cathode side of a polymer electrolyte membrane during use in a fuel cell, wherein the membrane of the assembly is susceptible to irreversible planar dimensional changes upon expansion and contraction with increased and decreased water content in the membrane, subjecting the membrane electrode assembly to a plurality of cycles that increase the water content and decrease the water content of the membrane so that the membrane electrode assembly repeatedly expands and contracts, and thereafter assembling the membrane electrode assembly in a fuel cell stack.

\* \* \* \* \*